United States Patent
Ciochina

(10) Patent No.: US 11,171,818 B2
(45) Date of Patent: Nov. 9, 2021

(54) TRANSMITTER AND METHOD FOR TRANSMITTING SYMBOL

(71) Applicant: MITSUBISHI ELECTRIC CORPORATION, Tokyo (JP)

(72) Inventor: Cristina Ciochina, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/966,252

(22) PCT Filed: Feb. 18, 2019

(86) PCT No.: PCT/JP2019/006930
§ 371 (c)(1),
(2) Date: Jul. 30, 2020

(87) PCT Pub. No.: WO2019/181371
PCT Pub. Date: Sep. 26, 2019

(65) Prior Publication Data
US 2021/0044470 A1  Feb. 11, 2021

(30) Foreign Application Priority Data

Mar. 22, 2018 (EP) .................................... 18305323

(51) Int. Cl.
*H04L 27/26* (2006.01)
*H04B 7/0456* (2017.01)
(Continued)

(52) U.S. Cl.
CPC ....... *H04L 27/2636* (2013.01); *H04B 7/0456* (2013.01); *H04L 1/0003* (2013.01); *H04L 1/0643* (2013.01)

(58) Field of Classification Search
CPC .... H04W 7/042; H04W 76/27; H04L 5/0053; H04L 5/0055; H04L 1/1812
(Continued)

(56) References Cited

U.S. PATENT DOCUMENTS

2010/0067512 A1* 3/2010 Nam ..................... H04L 5/0023
370/342
2010/0091903 A1* 4/2010 Castelain ............. H04L 1/0606
375/295

FOREIGN PATENT DOCUMENTS

EP  3 435 609 A1  1/2019

OTHER PUBLICATIONS

Qualcomm Incorporated, "On UL diversity transmission scheme", 3GPP TSG RAN WG1 Meeting NR#3, R1-1716730, Sep. 18-21, 2017, Nagoya, Japan, total 20 pages.
(Continued)

*Primary Examiner* — Shuwang Liu
*Assistant Examiner* — Gina M McKie
(74) *Attorney, Agent, or Firm* — Birch, Stewart, Kolasch & Birch, LLP

(57) ABSTRACT

The invention relates to transmitting symbols in a MIMO wireless communication system, said method comprising: determining a p value; applying to a first block of M data symbols $X=(X_0, \ldots X_{M-1})$ a pre-coder to obtain a second block of M symbols $Y=(Y_0, \ldots Y_{M-1})$ with Formula (I); applying a M size DFT then a N size IDFT to the first block of M symbols to obtain a first SC-FDMA symbol, said first SC-FDMA symbol being of a given duration; applying a M size DFT then a N size IDFT to the second block of M symbols to obtain a second SC-FDMA symbol, said second SC-FDMA symbol being of the given duration; transmitting
(Continued)

during a time interval of the given duration, simultaneously the first and second SC-FDMA symbols, into the radio signal.

15 Claims, 8 Drawing Sheets

(51) Int. Cl.
*H04L 1/00* (2006.01)
*H04L 1/06* (2006.01)

(58) Field of Classification Search
USPC .......................................................... 370/329
See application file for complete search history.

(56) References Cited

OTHER PUBLICATIONS

Qualcomm Incorporated, "UL transmit diversity for PUCCH", 3GPP TSG RAN WG1 RAN1 AdHoc, R1-1700825, Jan. 16-20, 2017, Spokane, USA, total 6 pages.

\* cited by examiner

TRANSMITTER AND METHOD FOR TRANSMITTING SYMBOL

TECHNICAL FIELD

The present invention generally relates to the domain of telecommunication system, and more specifically to wireless communication in the context of MIMO (Multiple Input Multiple Output) or MISO (Multiple Input Single Output) communications especially used in combination of OFDM-like transmission schemes.

BACKGROUND ART

The present invention applies in MIMO or MISO telecommunication systems using a specific single-symbol STBC pre-coder. SS-STBC is also referred to as one-symbol STBC, split-symbol STBC or virtual split STBC.

Classical SS-STBC schemes have been developed to offer low PAPR (peak-to-average power ratio), full diversity in the context of MISO or MIMO transmission and to preserve the single carrier property of the OFDM-like schemes.

Classical SS-STBC consists in applying a SS-STBC pre-coder to a block of symbols $X=(X_0, \ldots X_{M-1})$ to obtain a block of symbols $Y=(Y_0, \ldots Y_{M-1})$. Then an M-size DFT (discrete Fourier transform) is applied to each block of symbols X and Y. For each block of symbols, M complex symbols are obtained in the frequency domain, which are respectively $$(S_k^{Tx1})_{k \in [\![0;M-1]\!]} \text{ and } (S_k^{Tx2})_{k \in [\![0;M-1]\!]}.$$

These complex symbols are mapped in the frequency domain to M out of N inputs of a N-size IDFT (inverse discrete Fourier transform), obtaining thus at the output of the IDFTs a signal, $\tilde{x}^{Tx1}=(\tilde{x}^{Tx1}_0, \ldots, \tilde{x}^{Tx1}_{N-1})$ and a signal $\tilde{x}^{Tx2}=(\tilde{x}^{Tx2}_0, \ldots, \tilde{x}^{Tx2}_{N-1})$ each signal occupying, during a time interval corresponding to a single-carrier frequency division multiple access, SC-FDMA, symbol, M allocated subcarriers out of the N existing subcarriers. The signals $\tilde{x}^{Tx1}$ and $\tilde{x}^{Tx2}$ are time-domain signals whose frequency-domain representations, during a given time interval, are respectively the complex symbols $S_k^{Tx1}$ and $S_k^{Tx2}$ for each $k^{th}$ occupied subcarrier with k=0 to M−1. Equivalently, the time-domain signals $\tilde{x}^{Tx1}$ and $\tilde{x}^{Tx2}$ during a given time interval represent respectively the frequency domain complex symbols $S_k^{Tx1}$ and $S_k^{Tx2}$ for each $k^{th}$ frequency with k=0 to M−1. These time-domains signals $\tilde{x}^{Tx1}$ and $\tilde{x}^{Tx2}$ respectively correspond to SC-FDMA symbols. Therefore, samples in the signal $\tilde{x}^{Tx1}$ or in the signal $\tilde{x}^{Tx2}$ refer respectively to samples in a SC-FDMA symbol corresponding to a first transmit antenna and to samples in a SC-FDMA symbol corresponding to a second transmit antenna. A cyclic prefix (CP) can be optionally appended after IDFT.

The pre-coder applied to the block of symbols $X=(X_0, \ldots X_{M-1})$ (also referred as the first block of symbols) outputs the block of symbols $Y=(Y_0, \ldots Y_{M-1})$ (also referred as the second block of symbols). The first block of symbols $X=(X_0, \ldots X_{M-1})$ is divided in two parts of M/2 symbols as showed on FIG. 3. The first, respectively the second part, contains Q contiguous modulation symbols $(A_n)_{n \in [\![0;Q-1]\!]}$ respectively contiguous symbols $(B_n)_{n \in [\![0;Q-1]\!]}$. The Q contiguous modulation symbols of the first part and the second part contain data and/or reference signals.

To limit the interference between the two parts of the block symbols, the first part may contain an optional cyclic prefix of $P_1$ contiguous symbols and/or an optional cyclic postfix of $P_2$ contiguous symbols respectively positioned before and after the Q contiguous modulation symbols $(A_n)_{n \in [\![0;Q-1]\!]}$. The second part may also contain an optional cyclic prefix of $P_1$ contiguous symbols and an optional cyclic postfix of $P_2$ contiguous symbols respectively positioned before and after the Q contiguous modulation symbols $(B_n)_{n \in [\![0;Q-1]\!]}$. The first part contains P1 symbols in the cyclic prefix, P2 symbols in the cyclic postfix and Q data/RS symbols. Therefore $P_1+P_2+Q=M/2$, where $P_1$ and/or $P_2$ can be equal to zero. M is considered to be even.

Therefore, the first block of symbols $X=(X_0, \ldots X_{M-1})$ can be defined by:

$X_0=A_{Q-P_1}, \ldots, X_{P_1-1}=A_{Q-1}$, for the cyclic prefix of the first part, $X_{P_1}=A_0, X_{P_1+1}=A_1, \ldots, X_{P_1+Q-1}=A_{Q-1}$, for the data/RS symbols of the first part, $$X_{P_1+Q} = A_0, \ldots, X_{\frac{M}{2}-1} = A_{P_2-1},$$

for the cyclic postfix of the first part, $X_{M/2}=B_{Q-P_1}, \ldots, X_{M/2+P_1-1}=B_{Q-1}$, for the cyclic prefix of the second part, $X_{P_1+M/2}=B_0, X_{P_1+M/2+1}=B_1, \ldots, X_{M-P_2-1}=B_{Q-1}$, for the data/RS symbols of the second part, $X_{M-P_2}=B_0, \ldots, X_{M-1}=B_{P_2-1}$, for the cyclic postfix of the second part.

When applying the SS-STBC pre-coder to the first block of symbols $X=(X_0, \ldots X_{M-1})$, the second block of symbols $Y=(Y_0, \ldots Y_{M-1})$ is obtained. This second block of symbols can be defined relatively to the first block of symbols previously defined by:

$Y_0=\tilde{B}_{Q-P_1}, \ldots, Y_{P_1-1}=\tilde{B}_{Q-1}$, for the cyclic prefix of the first part, $Y_{P_1}=\tilde{B}_0, Y_{P_1+1}=\tilde{B}_1, \ldots, Y_{P_1Q-1}=\tilde{B}_{Q-1}$, for the data/RS symbols of the first part, $$Y_{P_1+Q} = \tilde{B}_0, \ldots, Y_{\frac{M}{2}-1} = \tilde{B}_{P_2-1},$$

for the cyclic postfix of the first part,
$Y_{M/2}=\tilde{A}_{Q-P_1}, \ldots, Y_{M/2+P_1-1}=\tilde{A}_{Q-1}$, for the cyclic prefix of the second part,
$Y_{P_1+M/2}=\tilde{A}_0, Y_{P_1M/2+1}=-\tilde{A}_2, \ldots, Y_{M-P_2-1}=-\tilde{A}_{Q-1}$, for the data/RS symbols of the second part,
$Y_{M-P_2}=-\tilde{A}_0, \ldots, Y_{M-1}=\tilde{A}_{P_2-1}$, for the cyclic postfix of the second part.

With $\tilde{A}_n = A^*_{mod(-n,Q)}$ and $\tilde{B}_n = B^*_{mod(-n,Q)}$ and X* is the complex conjugate of X.

In the following we refer to samples corresponding to symbol $X_n$ in signal $\tilde{x}^{Tx1}$ respectively $\tilde{x}^{Tx2}$ (or equivalently in the SC-FDMA symbol corresponding to respectively the first and second transmit antenna) only for high energy samples corresponding to symbol $X_n$, that is samples $\tilde{x}^{Tx1}_k$ or $\tilde{x}^{Tx2}_k$ for which the values $abs(\tilde{x}^{Tx1}_k/X_n)$ respectively the values $abs(\tilde{x}^{Tx2}_k/X_n)$ are superior to a given threshold conveniently chosen when a block of symbols $X^{(n)}=(0, \ldots, 0, X_n, 0, \ldots, 0)$ with a non-null value assigned to $X_n$ is presented to the input of a SS-STBC scheme describe above or the specific schemes described hereafter, whose outputs are the signal $\tilde{x}^{Tx1}=(\tilde{x}^{Tx1}_0, \ldots, \tilde{x}^{Tx1}_{N-1})$ and the signal $\tilde{x}^{Tx2}=(\tilde{x}^{Tx2}_0, \ldots, \tilde{x}^{Tx2}_{N-1})$.

However, such scheme using the SS-STBC pre-coder described above can be unsuited with most reference signal insertion patterns. In addition, the implementation of the SS-STBC pre-coder is of high complexity.

Moreover, such SS-STBC pre-coder makes the SS-STBC scheme sensitive to fast channel modification especially in millimeter-Wave systems, which is the case of the new radio standard or 5G currently at normalization. Operations performed at high carrier frequency level are subject to strong/fast phase variations due to different causes such as phase noise, carrier frequency offset, Doppler effects, etc. This sensitivity may lead to interference and performance loss.

In addition, the SS-STBC scheme is easily subject to interference when several terminals in the same cell use this same scheme to communicate with the base station.

SUMMARY OF INVENTION

The present invention aims at improving the situation.

To that end, the invention relates to a method for transmitting symbols through a radio signal in a wireless communication system, said radio signal being emitted by a transmitter comprising at least two transmit antennas, each antenna being configured for transmitting on at least an even number M, strictly greater than 1, of different frequencies, said method comprising:

applying to a first block of M symbols $X=(X_0, \ldots X_{M-1})$ a pre-coder to obtain a second block of M symbols $Y=(Y_0, \ldots Y_{M-1})$, with $$Y_k = \begin{cases} \varepsilon X^*_{\frac{M}{2}+P_1+mod(-k+P_1+p-1,Q)}, & \text{for } k \in \left[\!\left[ P_1; \frac{M}{2}-P_2 \right]\!\right] \\ -\varepsilon X^*_{P_1+mod(-k+P_1+\frac{M}{2}+p-1,Q)}, & \text{for } k \in \left[\!\left[ \frac{M}{2}+P_1; M-P_2 \right]\!\right] \end{cases},$$

with $P_1$ and $P_2$ predefined integers, positive or equal to 0, such as $P_1+P_2$ is strictly smaller than $M/2$, p a predetermined integer and $\varepsilon$ is 1 or $-1$ and $X_k^*$ being the complex conjugate of $X_k$;

applying at least a M size DFT then a N size IDFT corresponding to a first transmit antenna, to the first block of M symbols to obtain a first single-carrier frequency division multiple access, SC-FDMA, symbol representing the first block of M symbols, said first SC-FDMA symbol being of a given duration;

applying at least a M size DFT then a N size IDFT corresponding to a second transmit antenna, to the second block of M symbols to obtain a second single-carrier frequency division multiple access, SC-FDMA, symbol representing the second block of M symbols, said second SC-FDMA symbol being of the given duration;

transmitting during a time interval of the given duration, respectively on the first and second transmit antennas, simultaneously the first and second SC-FDMA symbols, into the radio signal.

It enables to choose or adapt the positions in the first block of M data symbols of the second symbol in the pairs of symbols ($X_k$;

$$X_{\frac{M}{2}+P_1+mod(-k+P_1+p-1,Q)}) \text{ for } k \in \left[\!\left[ P_1; \frac{M}{2}-P_2 \right]\!\right].$$

In the following, these pairs are also called the Alamouti pairs. Indeed, within the second block of M data symbols, the symbols issued from the Alamouti pair $$\left( X_k; X_{\frac{M}{2}+P_1+mod(-k+P_1+p-1,Q)} \right)$$

once pre-coded, that is $$\left( \varepsilon X^*_{\frac{M}{2}+P_1+mod(-k+P_1+p-1,Q)}; -\varepsilon X_k^* \right),$$

are found in the same positions $$\left( k, \frac{M}{2}+P_1+mod(-k+P_1+p-1, Q) \right).$$

We also denote abs $$\left( k - \left( \frac{M}{2}+P_1+mod(-k+P_1+p-1, Q) \right) \right)$$

as the precoding distance, being the distance between the two symbols of a same Alamouti pair in the first block of M symbols.

By adapting the value of p used in the pre-coder the method enables to optimize the specific SS-STBC like pre-coding according to other settings and the environment of the communication. For example, simply changing the value of p for pre-coding can reduce the decoding error relative for example to interferences or fast modification and/or alteration of the channel. In another example, the p value can also be chosen such as to adapt the specific SS-STBC like pre-coding to specific reference signal insertion patterns.

A p value is representative of a specific paring of the symbols in the first and second block of symbols. The paring is predetermined, that is the p value is predetermined, to take into account the settings and/or the environment of the communication (for example communication schemes and/or communication interference and/or characteristics of the channel etc), thus, such as the pre-coder is adapted to the communication settings and/or environment.

By time interval it is understood the time duration during which the samples corresponding to all the symbols $X_n$ with n=0 to M−1 are emitted which is equal to the duration of a SC-FDMA symbol.

The symbols $X_n$ of $X=(X_0, \ldots X_{M-1})$ may be obtained for example by a QPSK digital modulation scheme or any other digital modulation scheme as QAM. M is the number of allocated subcarriers. In such SS-STBC scheme, M is even. Specific modulation schemes or other sequences may also be used for some of the $X_n$, for example for the $X_n$ which are set as reference signals.

The transmit antennas are configured for transmitting on M frequencies, that is that the signal emitted by such transmitting antennas is provided by applying an N-size IDFT on M complex symbols, one complex symbol for each of the M allocated subcarriers. Previous to the IDFT, the M subcarriers may be mapped with a subcarrier mapping module on a greater number of N subcarriers. N-M of these subcarriers are not allocated subcarriers since they are set to zero, the M other subcarriers are M allocated subcarriers, on which the M complex symbols are mapped. In this case the IDFT module is of size N.

The radio signal is understood as the signal provided by all the transmit antennas together.

The value of ε is the predefined value 1 or −1. When not stated otherwise, in the following we consider ε=1. Indeed, changing the sign (+/−) of the signal related to the second antenna does not change the method.

By mod(A, B) it is understood A modulo B which is the remainder of the Euclidean division of A by B. Formally mod (A, B) can be written A−E[A/B]*B.

According to an aspect of the invention, mod(p, Q)≠1, with Q=M/2−(P1+P2).

This enables to avoid incompatibility with some reference signal insertion patterns defined for PUSCH in 3GPP NR. In addition, when using the SS-STBC like pre-coder with the p value set to 1, the maximal distance in the first block of M data symbols between two Alamouti pairs is M−(P$_1$+P$_2$)−2 resulting in an important time duration between the emission of the samples in the first single-carrier frequency division multiple access, SC-FDMA, symbol corresponding to the symbol $X_n$ and the emission in the second single-carrier frequency division multiple access, SC-FDMA, symbol corresponding to the symbol issued by the pre-coder from the symbol $X_n$, that is:

$$Y_{\frac{M}{2}+P_1+mod(-n+P_1,Q)}$$

when n is equal or bigger than $P_1$ and smaller or equal to $M/2-P_2$, $$Y_{P_1+mod(-n+P_1+\frac{M}{2},Q)}$$

when n is equal or bigger than $M/2+P_1$ and smaller or equal to $M-P_2$.

According to an aspect of the invention, $$mod(p, Q) \in \left[\left\lceil\frac{Q}{4}\right\rceil; \left\lfloor\frac{3 \cdot Q}{4}\right\rfloor\right]$$

with Q=M/2−(P1+P2). Advantageously, mod(p, Q) is equal to ⌈Q/2⌉ and/or ⌊Q/2⌋.

This enables to reduce the maximal distance in the first block of M data symbols between two symbols of an Alamouti pair, that is the maximal precoding distance. Therefore, reducing the maximal time duration between the emission of the samples in the first single-carrier frequency division multiple access, SC-FDMA, symbol corresponding to the symbol $X_n$ and the emission in the second single-carrier frequency division multiple access, SC-FDMA, corresponding to the symbol issued by the pre-coder from the symbol $X_n$.

Thus, by minimizing the time duration, this enables to minimize the channel changes between the emission of samples in the first SC-FDMA symbol corresponding to the symbol $X_n$ and emission of samples in the second SC-FDMA symbol corresponding to the symbol $X_n$. This, especially when the transmitter or receiver is in movement, reduces orthogonality loss between symbols of the same Alamouti pair, leading to interference and performance loss.

According to an aspect of the invention, mod(p, Q)=K, where K is a number of symbols in a group of symbols comprising symbols from the $P_1$-th symbol $X_{P_1}$ of the first block of M symbols to the ($P_1$+K)-th symbol $X_{P_1+K}$ of the first block of M symbols.

This enables the K symbols of the group of symbol to be positioned just after the cyclic prefix made of the $P_1$ first symbols of the first block of M symbols while the symbols (here after named the issued symbols) in the second block of symbols issued from the symbols of the group are also positioned just after the cyclic prefix made of the $P_1$ symbols from the $$Y_{\frac{M}{2}}$$

to the $$Y_{\frac{M}{2}+P_1-1}$$

of the second block of M symbols. Therefore, the symbols of the group of K symbol and the issued symbols are more protected against interferences, and especially multipath interferences, thus enabling to improve the transmission quality of those symbols.

Advantageously the symbols of the group of symbols are reference signal symbols and/or control symbols. Reference signal symbols, that is symbols representing a reference signal, and control symbols, that is symbols representing control information may be particularly important for decoding properly the other symbols, therefore, by setting the K symbols as reference signal symbols or control symbols it insures better reception of the data intended to the receiver.

According to an aspect of the invention, mod(p, Q)=0, with Q=M/2−(P1+P2).

This enables to reduce the complexity of the implementation.

According to an aspect of the invention, L first groups $G_i$ of respectively $K_i$ symbols of the first block of M symbols, with $\Sigma_{j=1}^{L}K_j$ equal to Q are defined and for each i:

the $K_i$ symbols of the i-th first group $G_i$ being the symbols from the $(P_1+\Sigma_{j=1}^{i-1}K_j)$-th symbol $$X_{P_1+\Sigma_{j=1}^{i-1}K_j}$$

to the $(P_1+\Sigma_{j=1}^{i}K_j-1)$-th symbol $X_{P_1+\Sigma_{j=1}^{i}K_j}-1$ of the first block of M data symbols are of the same i-th type as $K_i$ symbols of a second group $G'_i$ of $K_i$ symbols of the first block of M symbols, the $K_i$ symbols of the second group $G'_i$ being the symbols from the $(M-P_2-\Sigma_{j=1}^{i}K_j)$-th symbol $$X_{M-P_2-\Sigma_{j=1}^{i}K_j}$$

to the $(M-P_2-\Sigma_{j=1}^{i-1}K_j-1)$-th symbol $$X_{M-P_2-\sum_{j=1}^{i-1}K_j-1}$$

of the first block of M symbols.

The group structure defined above is preserved by the transformation operated by the pre-coder. That is, the groups of symbols of the second block of M symbols comprising the issued symbols of the groups $\{G_i\}_{i\in[1;L]}$ and $\{G'_i\}_{i\in[1;L]}$ are of the same type as the groups $\{G_i\}_{i\in[1;L]}$ and $\{G'_i\}_{i\in[1;L]}$. Thus, if for each i, the groups $G_i$ and $G'_i$ are of the same type then the samples of symbols $X_n$ (in the first SC-FDMA symbol) and $Y_n$ (in the second SC-FDMA symbol) which are emitted at the same time in the radio signal are of the same types. Therefore, such a group structure enables to separate the processing at the receiver of the symbols of the groups $G_i$ and $G'_i$ with the other symbols, thus, enabling to separate the processing by types of symbols. For example, the receiver can process the groups of reference signals separately.

This structure also enables to handle interference between the symbols of different groups and especially from groups with different types of symbols. Advantageously, for each i, the i-th type of symbol is one among different symbol categories, such as, for example, data symbol, reference signal symbol and/or control symbol. Advantageously, to avoid processing an important amount of groups, for each i, the symbols of the i-th group $G_i$ are of different type of symbol than the symbols of the i+1-th group $G_{i+1}$.

Advantageously, the determining of a p value comprises determining an optimized p value used as the p value in the pre-coder. Advantageously, the determining of a p value comprises calculating the p value.

The determining of an appropriate p value (or optimized p value) can be done by several manners. For example the p value can be determined based on:
- a cell specific p value information determined by a base station, enabling to reduce the effect of interferences between transmitters localized in the coverage area of different base stations; the value being cell-specific, it only needs to be transmitted when the receiver enters a new cell, and/or when the cell specific p value is changed; therefore, it can be transmitted with low signaling overhead (that is with low amount of control data);
- a dynamic control indication, via the control channel (for example a DCI (downlink control information) field or a SCI (sidelink control information) field) which enables to adapt the pre-coder according to the configuration of the cell and/or according to user-specific configuration such as resource allocation;
- a reference signal, RS, configuration, enabling to determine a p value which is compatible with the specific reference signal insertion pattern used. Indeed, if $X_n$ is used as a reference symbol then the symbol $$Y_{\frac{M}{2}+P_1+mod(-n+P_1+p-1,Q)}, \text{ if } n \in \left[P_1; \frac{M}{2}-P_2\right] \text{ or } Y_{P_1+mod(-k+P_1+\frac{M}{2}+p-1,Q)},$$
$$\text{if } k \in \left[\frac{M}{2}+P_1; M-P_2\right]$$

will also be a reference signal, it is thus convenient to also set the Alamouti pairs of these symbols as reference symbols which requires to adapt the p value based on the RS insertion pattern configured by the base station;
- modulation and coding scheme, MCS, and/or any other user-specific or group/specific parameter, which enables randomizing the interference profile said user creates upon other users;
- a size of a resource allocation allocated to the transmitter, which enables easy decoding when users with the same allocation are paired in MU-MIMO transmission;
- a transmitter specific p value information determined by a base station, the base station can specify directly to the terminal the p value to use;
- another transmitter's p' value such as the another transmitter applies to a first block of M' symbols $X=(X_0, \ldots X_{M'-1})$ a pre-coder to obtain a second block of M' symbols $Y=(Y_0, \ldots Y_{M'-1})$, with $$Y_k = \begin{cases} \varepsilon X^*_{\frac{M'}{2}+P'_1+mod(-k+P'_1+p'-1,Q)}, & \text{for } k \in \left[P'_1; \frac{M'}{2}-P'_2\right] \\ -\varepsilon X^*_{P'_1+mod(-k+P'_1+\frac{M'}{2}+p'-1,Q)}, & \text{for } k \in \left[\frac{M'}{2}+P'_1; M'-P'_2\right] \end{cases},$$

with $P'_1$ and $P'_2$ predefined integers, positive or equal to 0, such as $P'_1+P'_2$ is strictly smaller than $M'/2$ and $\varepsilon$ is 1 or −1. This enables easy decoding when users with different allocation are paired in MU-MIMO transmission;
- a set of predetermined values determined by a base station can also be transmitted to the terminal including the p values which are authorized by the base station for the terminal communicating with it. Based on such set of values the p value used can be determined randomly. Thus, there is a lower probability that two terminals use the same p value.

The above reasoning applies in a similar manner as well in the case when the transmitter is the user equipment and receiver is the base station, and in the case when the receiver is the user equipment (that is the mobile terminal) and the transmitter is the base station. In all cases, the receiver needs to be aware of the parameter used by the transmitter.

In both cases, both the transmitter and the receiver need to have a common understanding about the p value used during transmission. The value is either signaled, or implicit rules allow the transmitter and the receiver to unambiguously determine the value to be used.

By dynamic control indication it is understood information carried by a physical control channel (e.g., in LTE or NR, PDCCH, PUCCH, PSCCH). For example, the information can be a field of a DCI/UCI/SCI format.

By user-specific parameter it is understood a parameter that can be individually configured for a user, e.g. via a physical control channel or by higher layer signaling. Such parameters, configured either for uplink or for downlink communication, include (but are not limited to) modulation and coding scheme, resource allocation, reference signal configuration/pattern (e.g. DMRS, SRS, PTRS, CSI-RS, TRS, PRS, etc), transmission scheme, number of codewords, power control, etc. In a similar manner, by group-specific parameter it is understood a parameter that can be configured for a group of users and that is common to that group.

According to an aspect of the invention the value of a n-th symbol $X_n$ of the first block of M data symbols:
- is equal to a value of a (n+Q)-th symbol $X_{n+Q}$ of the first block of M data symbols if $n \in [\![0;P_1-1[\![ \cup [\![M/2;M/2+P_1-1[\![$;

is equal to a value of a (n-Q)-th symbol $X_{n-Q}$ of the first block of M data symbols if n∈

$$\left[\left[\frac{M}{2}-P_2;\frac{M}{2}-1\right]\right]\cup[\![M-P_2;M-1]\!].$$

This enables to set prefix and/or postfix symbols to protect the useful symbols.

A second aspect of the invention concerns a computer program product comprising code instructions to perform the method as described previously when said instructions are run by a processor.

A third aspect of the invention concerns a transmitter for transmitting data symbols through a radio signal in wireless communication system, said transmitter comprising:
 at least two transmit antennas, each antenna being configured for transmitting on at least an even number M, strictly greater than 1, of different frequencies,
 a processor; and
 a non-transitory computer-readable medium comprising instructions stored thereon, which when executed by the processor configure the transmitter to:
 apply to a first block of M symbols X=($X_0$, ... $X_{M-1}$) a precoder to obtain a second block of M symbols Y=($Y_0$, ... $Y_{M-1}$), with $$Y_k = \begin{cases} \varepsilon X^*_{\frac{M}{2}+P_1+mod(-k+P_1+p-1,Q)}, \text{ for } k \in \left[\!\left[P_1;\frac{M}{2}-P_2\right]\!\right] \\ -\varepsilon X^*_{P_1+mod(-k+P_1+\frac{M}{2}+p-1,Q)}, \text{ for } k \in \left[\!\left[\frac{M}{2}+P_1;M-P_2\right]\!\right] \end{cases},$$

with $P_1$ and $P_2$ predefined integers, positive or equal to 0, such as $P_1+P_2$ is strictly smaller than M/2, p a predetermined integer and ε is 1 or −1 and $X_k^*$ being the complex conjugate of $X_k$;
 apply at least a M size DFT then a N size IDFT corresponding to a first transmit antenna, to the first block of M symbols to obtain a first single-carrier frequency division multiple access, SC-FDMA, symbol representing the first block of M symbols, said first SC-FDMA symbol being of a given duration;
 apply at least a M size DFT then a N size IDFT corresponding to a second transmit antenna, to the second block of M symbols to obtain a second single-carrier frequency division multiple access, SC-FDMA, symbol representing the second block of M symbols, said second SC-FDMA symbol being of the given duration;
 transmit during a time interval of the given duration, respectively on the first and second transmit antennas, simultaneously the first and second SC-FDMA symbols, into the radio signal.

The present invention is illustrated by way of example, and not by way of limitation, in the figures of the accompanying drawings, in which like reference numerals refer to similar elements.

DESCRIPTION OF EMBODIMENTS

Figure 1:
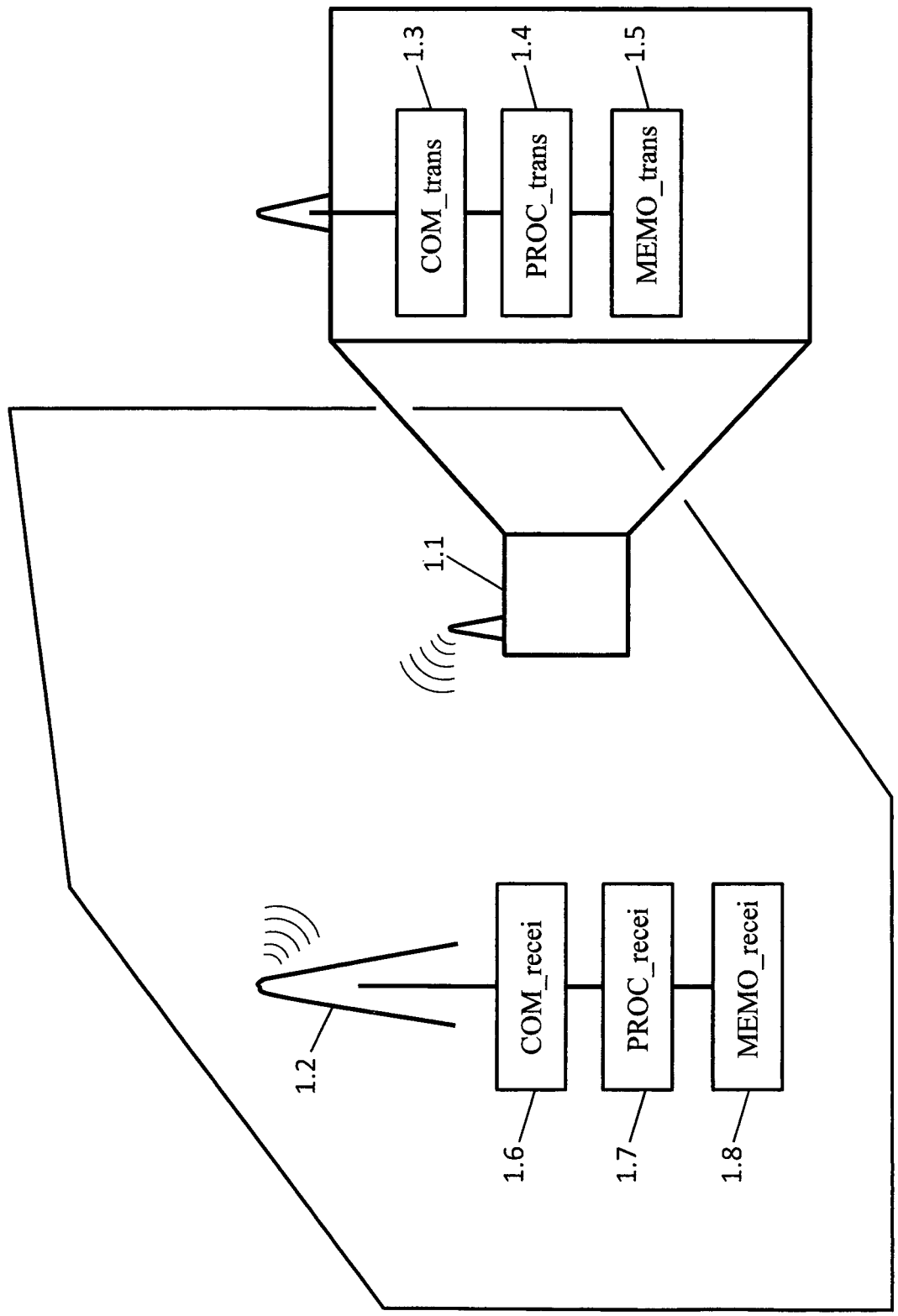
FIG. 1 illustrates a specific SS-STBC like transmitter and receiver.

Referring to FIG. 1, there is shown a transmitter 1.1 transmitting a radio signal to a receiver 1.2. The transmitter 1.1 is in the cell of the receiver 1.2. This transmission may be a specific SS-STBC based transmission in the context of OFDM based system. In this example the transmitter 1.1 is a mobile terminal (also called user equipment, UE) and the receiver 1.2 is a fixed station which in the context of LTE is a base station. The transmitter 1.1 can as well be the fixed station and the receiver 1.2 a mobile terminal. It is also possible to have both the transmitter 1.1 and the receiver 1.2 as mobile terminals (for example during device-to-device or sidelink communication).

The transmitter 1.1 comprises one communication module (COM_trans) 1.3, one processing module (PROC_trans) 1.4 and a memory unit (MEMO_trans) 1.5. The MEMO_trans 1.5 comprises a non-volatile unit which retrieves the computer program and a volatile unit which retrieves the parameters used for the communication, like the p value used for pre-coding. The PROC_trans 1.4 is configured to pre-code the first block of M symbols X into the second block of M symbols Y according to the specific SS-STBC like pre-coder. The COM_trans is configured to transmit to the receiver 1.2 the radio signal. The processing module 1.4 and the memory unit 1.5 can be dedicated to the pre-coding or also used for other functions of the transmitter like for the other steps of the processing of the radio signal.

The receiver 1.2 comprises one communication module (COM_recei) 1.6, one processing module (PROC_recei) 1.7 and a memory unit (MEMO_recei) 1.8. The MEMO_recei 1.8 comprises a non-volatile unit which retrieves the computer program and a volatile unit which retrieves the parameters used for the communication, like the p value used for pre-coding. The PROC_recei 1.7 is configured to de-code the signal to retrieve the symbols of the first block of M symbols X. The COM_recei 1.6 is configured to receive from the transmitter the radio signal.

Figure 2:
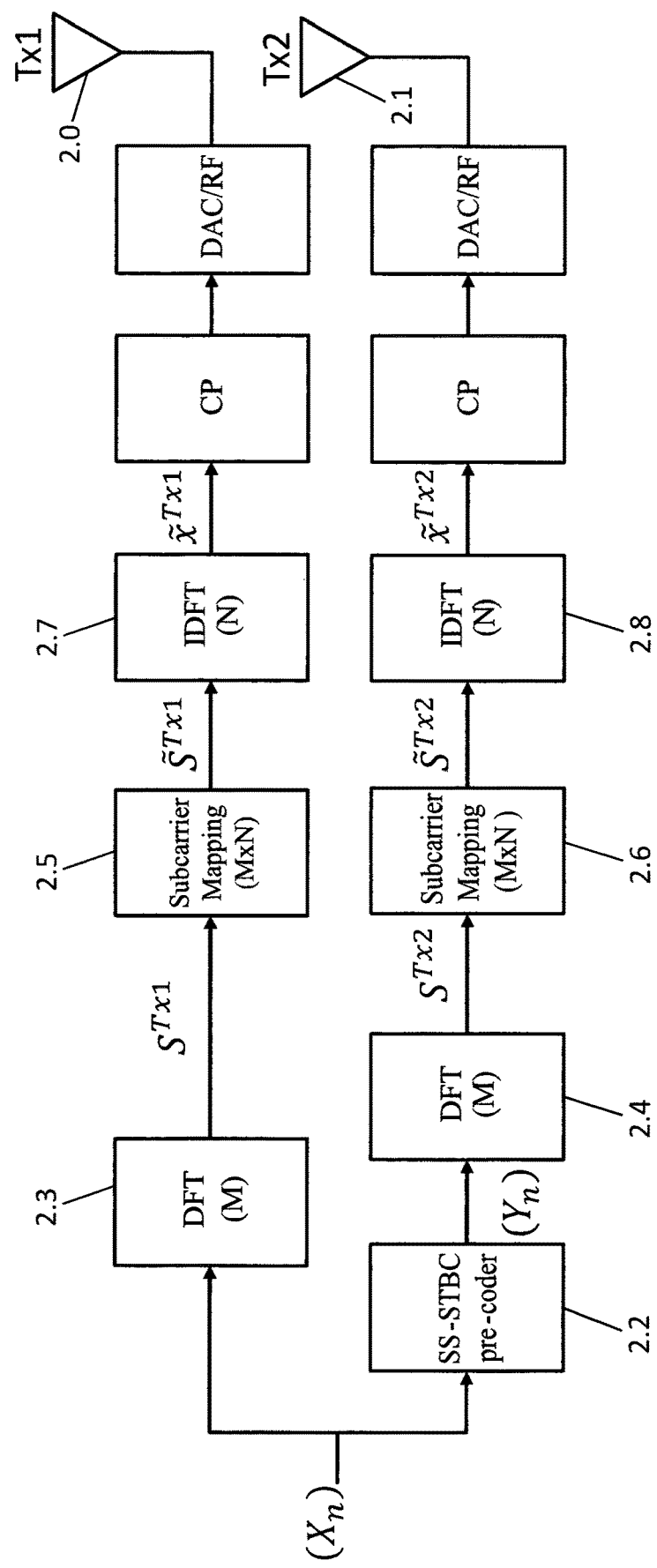
FIG. 2 schematizes a block diagram of a specific SS-STBC like transmitter according to the invention.

Referring to FIG. 2, there is shown a block diagram of a specific SS-STBC like transmitter. Such specific SS-STBC like transmitters apply SC-FDMA schemes on a block of symbols (first block of symbols) and a pre-coded block of symbols (second block of symbols) to obtain the radio signal. This ensures full diversity for a rate of one symbol per channel use. Such transmitter emits a radio signal by emitting on at least two transmit antennas Tx1 2.0 and Tx2 2.1.

The radio signal being provided by applying a specific SS-STBC like pre-coder 2.2 to a first block of symbols X=($X_0$, ... $X_{M-1}$) and obtaining a second block of symbols Y=($Y_0$, ... $Y_{M-1}$). The first block of symbols may be obtained by a QPSK digital modulation scheme or any other digital modulation scheme as QAM. M is the number of allocated subcarriers. In such SS-STBC scheme, M is even.

Then, a M-size DFT 2.3, 2.4 (discrete Fourier transform) is applied to each block of symbols X and Y. For each block of symbols, M complex symbols are obtained in the frequency domain, which are respectively $$(S_k^{Tx1})_{k \in [\![0;M-1]\!]} \text{ and } (S_k^{Tx2})_{k \in [\![0;M-1]\!]}.$$

That is, for each M-size DFT 2.3, 2.4, one complex symbol is obtained for each k-th subcarrier among the M allocated subcarriers. These complex symbols are mapped with subcarrier mapping modules 2.5 and 2.6 in the frequency domain to M out of N inputs of N-size IDFT modules, 2.7, 2.8. Regarding the subcarrier mapping, each vector of complex symbols $$S^{Tx1} = (S_k^{Tx1})_{k \in [\![0;M-1]\!]} \text{ and } S^{Tx2} = (S_k^{Tx2})_{k \in [\![0;M-1]\!]}$$

is mapped to the M allocated subcarriers out of N existing subcarriers via subcarrier mapping modules 2.5 and 2.6. The subcarrier mapping can be for example localized, that is the M elements of each vector $S^{Tx1,2}$ are mapped to M consecutive subcarriers among the N existing. The subcarrier mapping can be for example distributed, that is the M elements of each vector $S^{Tx1,2}$ are mapped equally distanced over the entire bandwidth with zero occupying the unused subcarriers.

Inverse DFT of size N 2.7 and 2.8 are then applied to the two resulting vectors $\tilde{S}^{Tx1}$ and $\tilde{S}^{Tx2}$ of the subcarrier mapping modules 2.5 and 2.6, therefore generating two SC-FDMA symbols, each of them being sent at the same time from respectively one of the two transmit antennas. More precisely, at the output of the IDFT modules, 2.7, 2.8 a signal $\tilde{x}^{Tx1} = (\tilde{x}^{Tx1}_0, \ldots, \tilde{x}^{Tx1}_{N-1})$ and a signal $\tilde{x}^{Tx2} = (\tilde{x}^{Tx2}_0, \ldots, \tilde{x}^{Tx2}_{N-1})$ are obtained. Each of these signals occupy during a time interval corresponding to a single-carrier frequency division multiple access, SC-FDMA, symbol, M allocated subcarriers out of the N existing subcarriers. The signals $\tilde{x}^{Tx1}$ and $\tilde{x}^{Tx2}$ are time-domain signals whose frequency-domain representations, during a given time interval, are respectively the complex symbols $S_k^{Tx1}$ and $S_k^{Tx2}$ for each $k^{th}$ occupied subcarrier with k=0 to M-1. Equivalently, the time-domain signals $\tilde{x}^{Tx1}$ and $\tilde{x}^{Tx2}$ during a given time interval represent respectively, in the frequency domain, the complex symbols $S_k^{Tx1}$ and $S_k^{Tx2}$ for each $k^{th}$ frequency with k=0 to M-1. These time-domains signals $\tilde{x}^{Tx1}$ and $\tilde{x}^{Tx2}$ respectively correspond to SC-FDMA symbols. Therefore, samples in the signal $\tilde{x}^{Tx1}$ or in the signal $\tilde{x}^{Tx2}$ refer respectively to samples in a SC-FDMA symbol corresponding to a first transmit antenna 2.0 and to samples in a SC-FDMA symbol corresponding to a second transmit antenna 2.1.

A cyclic prefix can be optionally appended after IDFT.

Figure 3:
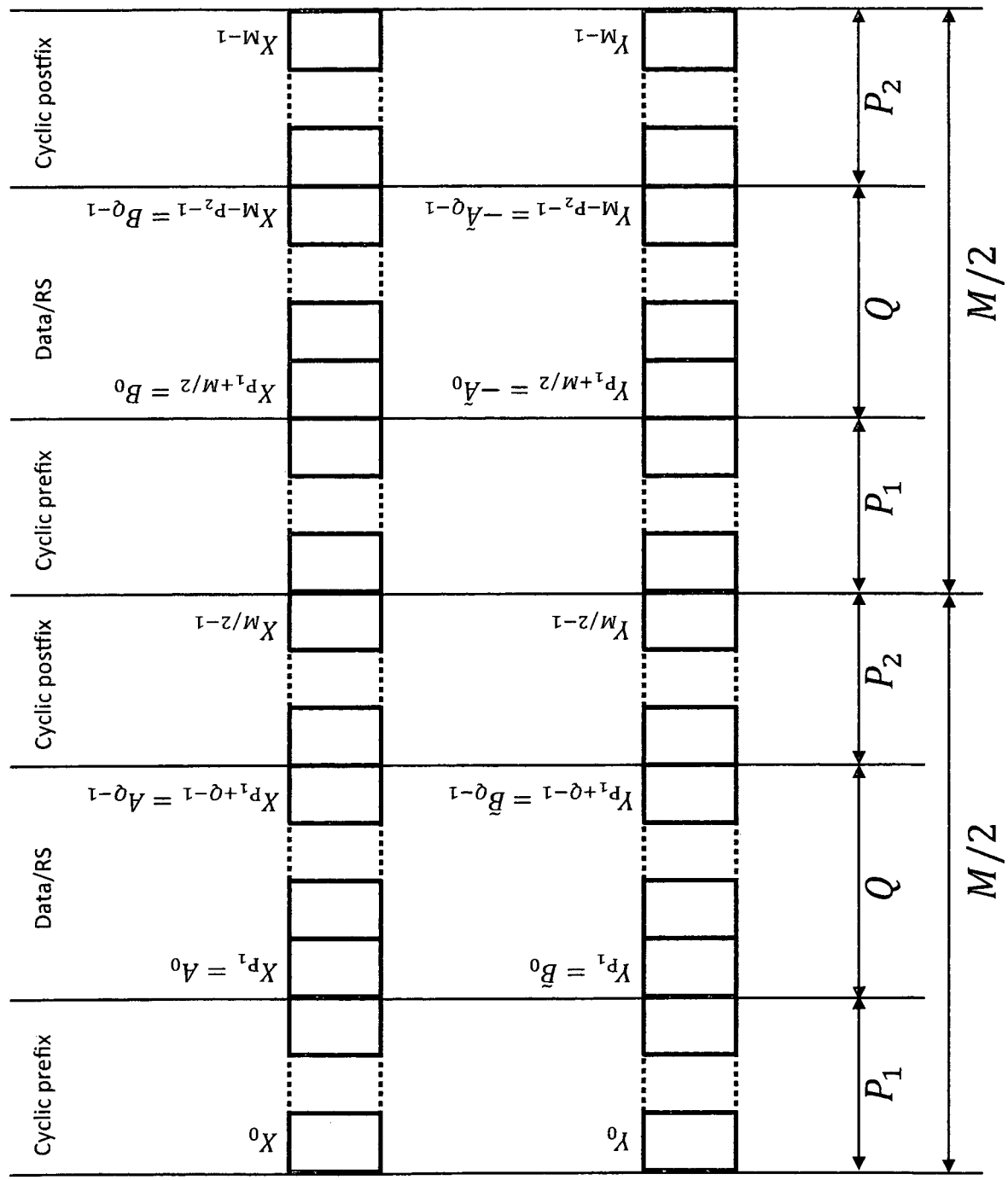
FIG. 3 details the specific SS-STBC like pre-coder logical functioning according to the invention.

Referring to FIG. 3 there is shown in detail the logical functioning of the specific SS-STBC like pre-coder module 2.2.

The SS-STBC like pre-coder 2.2 applied to the block of symbols $X=(X_0, \ldots X_{M-1})$ (also referred as the first block of symbols) outputs the block of symbols $Y=(Y_0, \ldots Y_{M-1})$ (also referred as the second block of symbols). Considering the first block of symbols $X=(X_0, \ldots X_{M-1})$ this one is divided in two parts of M/2 symbols as showed on FIG. 2.2. The first, respectively the second part, contains Q contiguous modulation symbols $(A_n)_{n \in [\![0;Q-1]\!]}$, respectively contiguous symbols $(B_n)_{n \in [\![0;Q-1]\!]}$. The Q contiguous modulation symbols of the first part and the second part may contain data, control information and reference signals.

To limit the interference between the two parts of the block of symbols, the first part may contain a cyclic prefix of $P_1$ contiguous symbols and/or a cyclic postfix of $P_2$ contiguous symbols respectively positioned before and after the Q contiguous modulation symbols $(A_n)_{n \in [\![0;Q-1]\!]}$. The second part may also contain a cyclic prefix of $P_1$ contiguous symbols and/or a cyclic postfix of $P_2$ contiguous symbols respectively positioned before and after the Q contiguous modulation symbols $(B_n)_{n \in [\![0;Q-1]\!]}$. P1 and/or P2 values may also be set to 0, and in that case no prefix and/or no postfix is included.

Therefore, the first block of symbols $X=(X_0, \ldots X_{M-1})$ can be defined:

$X_0 = A_{Q-P_1}, \ldots, X_{P_1-1} = A_{Q-1}$, for the cyclic prefix of the first part, $X_{P_1} = A_0, X_{P_1+1} = A_1, \ldots, X_{P_1+Q-1} = A_{Q-1}$, for the useful symbols (data, RS, control symbols) of the first part, $$X_{P_1+Q} = A_0, \ldots, X_{\frac{M}{2}-1} = A_{P_2-1},$$

for the cyclic postfix of the first part, $X_{M/2} = B_{Q-P_1}, \ldots, X_{M/2+P_1-1} = B_{Q-1}$, for the cyclic prefix of the second part, $X_{P_1+M/2} = B_0, X_{P_1+M/2+1} = B_2, \ldots, X_{M-P_2-1} = B_{Q-1}$, for the useful symbols (data, RS, control symbols) of the second part, $X_{M-P_2} = B_0, \ldots, X_{M-1} = B_{P_2-1}$, for the cyclic postfix of the second part.

When applying the specific SS-STBC like pre-coder to the first block of symbols $X=(X_0, X_{M-1})$, the second block of symbols $Y=(Y_0, \ldots Y_{M-1})$ is obtained. This second block of symbols can be defined relatively to the first block of symbols previously defined, as:

$Y_0 = \tilde{B}_{Q-P_1}, \ldots, Y_{P_1-1} = \tilde{B}_{Q-1}$, for the cyclic prefix of the first part, $Y_{P_1} = \tilde{B}_0, Y_{P_1+1} = \tilde{B}_1, \ldots, Y_{P_1+Q-1} = \tilde{B}_{Q-1}$, for the useful symbols (data, RS, control symbols) of the first part, $$Y_{P_1+Q} = \tilde{B}_0, \ldots, Y_{\frac{M}{2}-1} = \tilde{B}_{P_2-1},$$

for the cyclic postfix of the first part, $Y_{M/2} = -\tilde{A}_{Q-P_1}, \ldots, Y_{M/2+P_1-1} = -\tilde{A}_{Q-1}$, for the cyclic prefix of the second part, $Y_{P_1+M/2} = -\tilde{A}_0, Y_{P_1+M/2+1} = -\tilde{A}_2, \ldots, Y_{M-P_2-1} = -\tilde{A}_{Q-1}$, for the useful symbols (data, RS, control symbols) of the second part, $Y_{M-P_2} = -\tilde{A}_0, \ldots, Y_{M-1} = -\tilde{A}_{P_2-1}$, for the cyclic postfix of the second part.

With $\tilde{A}_n = A^*_{mod(-n+p-1,Q)}$ and $\tilde{B}_n = B^*_{mod(-n+p-1,Q)}$ and $X^*$ is the complex conjugate of X.

In a variant, zero padding can be used instead of cyclic prefix/postfix. In yet another variant, cyclic prefix and/or postfix can be inserted with respect to groups of symbols within the Q contiguous useful symbols, instead of being inserted with respect to the Q contiguous useful symbols.

Therefore, Y can be defined, regarding the data, control and Reference signal symbols based on X by:

$$Y_k = \begin{cases} \varepsilon X^*_{\frac{M}{2}+P_1+mod(-k+P_1+p-1,Q)}, \text{ for } k \in \left[\!\left[P_1; \frac{M}{2}-P_2\right]\!\right] \\ -\varepsilon X^*_{P_1+mod(-k+P_1+\frac{M}{2}\,p-1,Q)}, \text{ for } k \in \left[\!\left[\frac{M}{2}+P_1; M-P_2\right]\!\right] \end{cases}$$

With ε the value 1 or −1. When not stated otherwise, in the following we consider ε=1. Indeed, changing the sign (+/−) of the signal related to the second antenna does not change the method.

Figure 4:
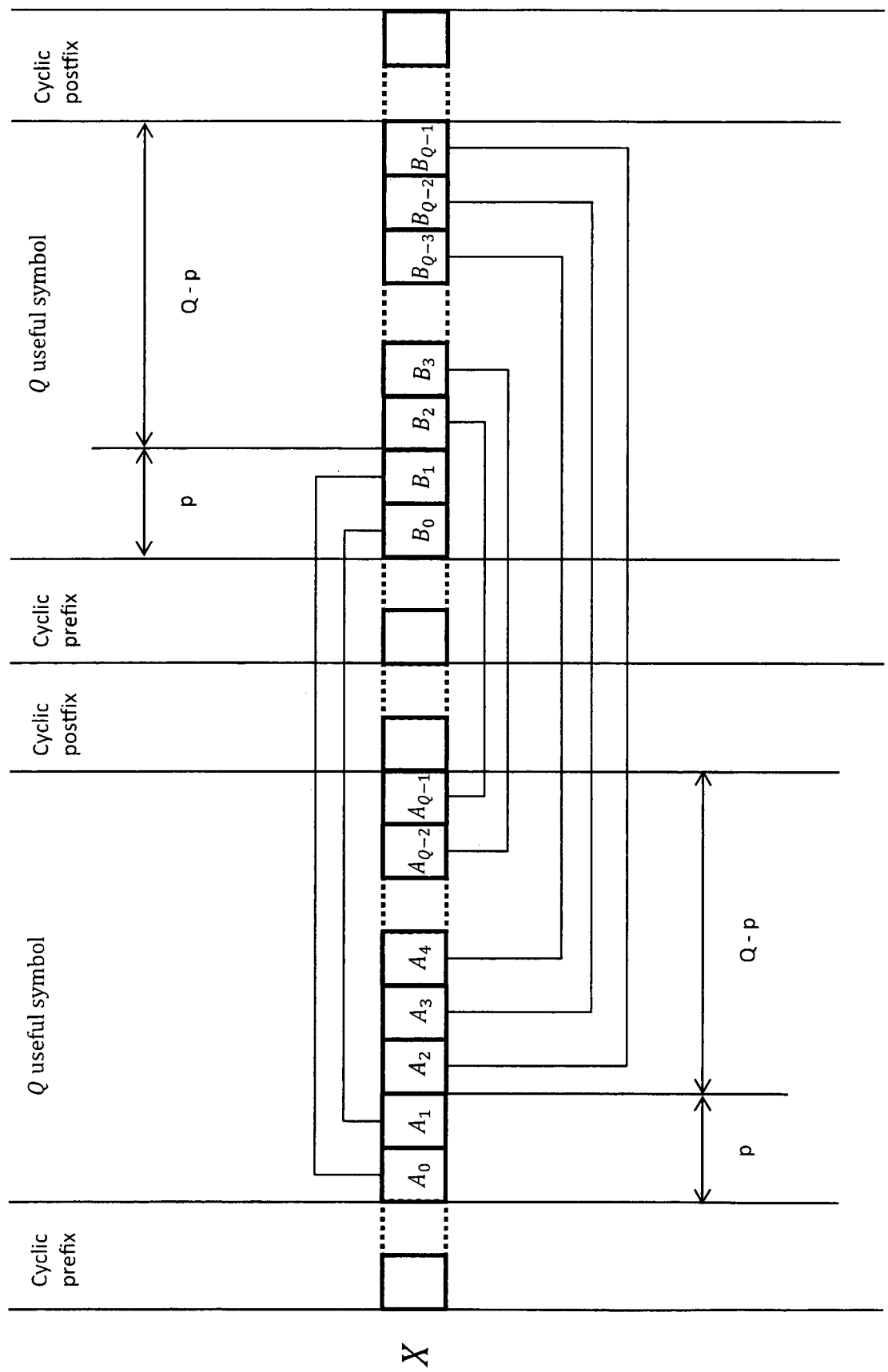
FIG. 4 details the specific SS-STBC like pre-coder logical functioning according to the invention.

Referring to FIG. 4 there is shown in detail the logical functioning of the specific SS-STBC like pre-coder module 2.2 and the specific Alamouti pairing structure induced by the specific SS-STBC like pre-coder module 2.2. That is, the FIG. 4 details the paring of symbols in the first block of M symbols according to the invention.

When p is different from 0, the 0-th symbol $A_0$ of the Q useful symbols of the first part of the first block of M symbols is paired with the p−1-th symbol $B_{p-1}$ of the Q useful symbols of the second part of the first block of M symbols. Then the symbol $A_i$ is paired with the symbol $B_{p-i}$ for each i strictly smaller than p.

Then the remaining symbols $A_p$ to $A_{Q-1}$ of the Q useful symbols of the first part of the first block of M symbols are paired with the remaining symbols $B_{Q-1}$ to $B_p$ of the Q useful symbols of the second part of the first block of M symbols, with: the first symbol $A_p$ of the first group (symbols Ap to $A_{Q-1}$) being paired with the last symbol $B_{Q-1}$ of the second group symbols ($B_p$ to $B_{Q-1}$), the second symbol $A_{p+1}$ of the first group (symbols $A_p$ to $A_{Q-1}$) being paired with the before last symbol $B_{Q-2}$ of the second group symbols ($B_p$ to $B_{Q-1}$), and so on.

When p is equal to zero, the first symbol $A_0$ is paired with the last symbol $B_{Q-1}$, the second symbol $A_1$ is paired with the before last symbol $B_{Q-2}$, and so on.

Two symbols $X_a$ and $X_b$ of the first block of symbols are considered as paired when the position of the symbol issued from the symbol $X_a$, that is the position a' of the symbol $Y_{a'}$ such as $Y_{a'}=\pm X^*_a$ is the position b. Therefore, the symbol $X_a$ and the symbol issued from $X_a$, $Y_{a'}$, are respectively in positions in the first and second block of symbols which are a and b, whereas the symbol $X_b$ and the symbol issued from $X_b$ are respectively in positions in the first and second block of symbol which are b and a.

Figure 5:
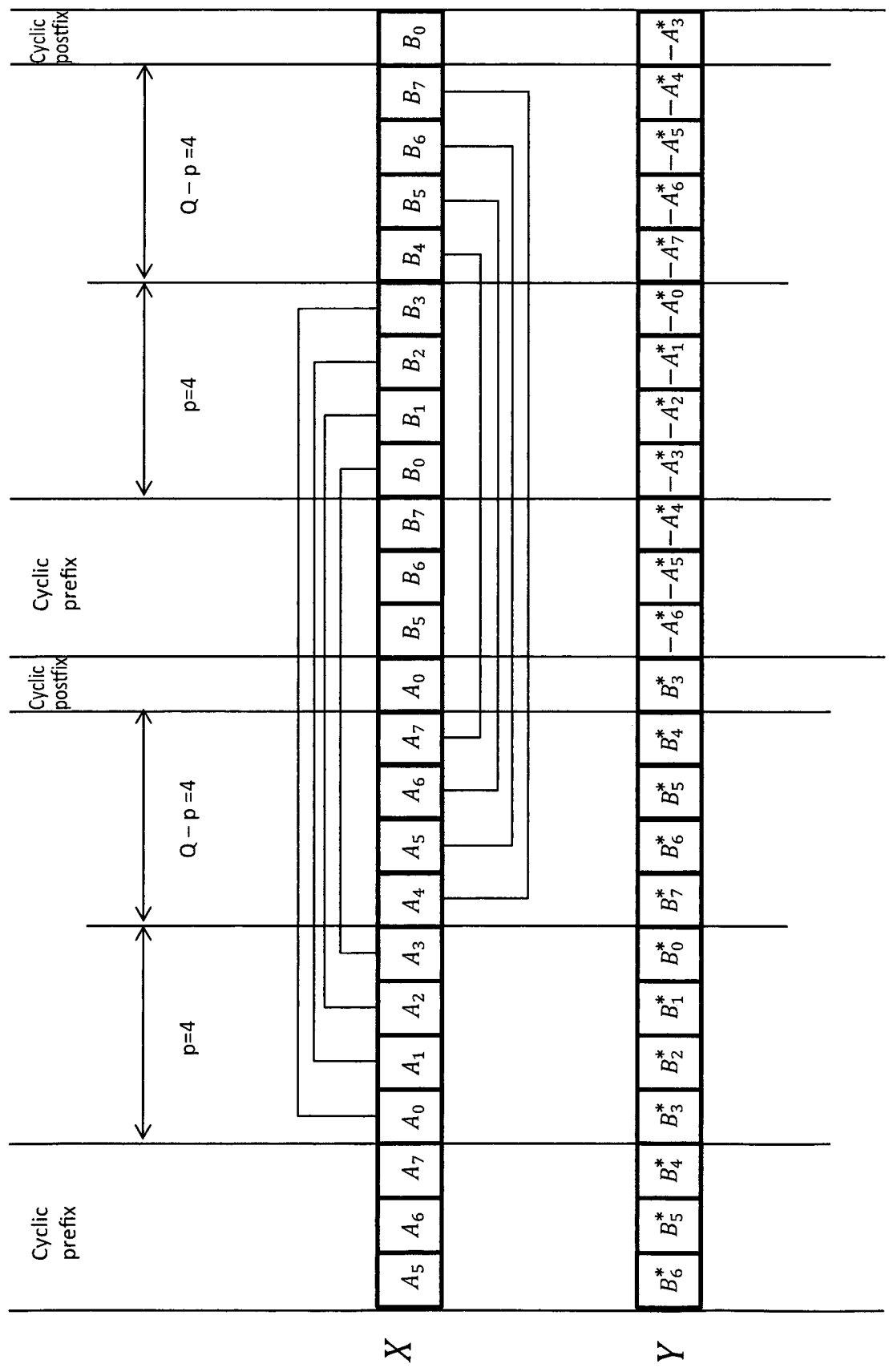
FIG. 5 details the specific SS-STBC like pre-coder logical functioning with the p value set to ⌈Q/2⌉ and/or ⌊Q/2⌋ according to the invention.

Referring to FIG. 5, it gives the details of the specific SS-STBC like pre-coder logical functioning with the p value set to ⌈Q/2⌉ according to an embodiment. In the example of FIG. 5 the sizes of P1, P2 and Q are set to simplify the presentation of this embodiment. Thus $(P_1, P_2, Q)=(3,1,8)$. Of course, the present invention is not limited to such sizes of P1, P2 and Q.

The maximal precoding distance between two symbols of an Alamouti pair is 15 symbols, that is between two symbols of an Alamouti pair there are only 14 symbols.

Several configurations of the subcarrier mapping modules 2.5 and 2.6, are possible, for example the subcarrier mapping can be localized that is the M elements of each vector $S^{Tx1,2}$ are mapped to M consecutive subcarriers among the N existing.

Thus, when N is a multiple of M, the signal in the time domain at the output of the IDFT module 2.7, $\tilde{x}^{Tx1}=(\tilde{x}^{Tx1}_0,\ldots,\tilde{x}^{Tx1}_{N-1})$, and at the output of the IDFT module 2.8, $\tilde{x}^{Tx2}=(\tilde{x}^{Tx2}_0,\ldots,\tilde{x}^{Tx2}_{N-1})$, have respectively exact copies of the input time symbols $X_n$ and $Y_n$ (with a scaling factor) in the position M.n, that is $\tilde{x}^{Tx1}=(\tilde{x}^{Tx1}_0=\alpha X_0,\ldots,$ $\tilde{x}^{Tx1}_M=\alpha X_1,\ldots,\tilde{x}^{Tx1}_{2M}=\alpha X_2,\ldots,\tilde{x}^{Tx1}_{N-m}=\alpha X_{M-1})$ and $\tilde{x}^{Tx2}=(\tilde{x}^{Tx2}_0=\alpha Y_0,\ldots,\tilde{x}^{Tx2}_M=\alpha Y_1,\ldots,\tilde{x}^{Tx2}_{2M}=\alpha Y_2,\ldots,\tilde{x}^{Tx2}_{N-M}=\alpha Y_{M-1})$.

In the other positions the values of the samples in the first and second SC-FDMA symbols are respectively sums of all the $X_n$ and $Y_n$ with different complex-weighting. Therefore, $\tilde{x}^{Tx1}$ and $\tilde{x}^{Tx2}$ are respectively oversampled version of the first and second block of symbols. More explanations can be found in "Single carrier FDMA: a new air interface for long term evolution", H G Myung, D J Goodman—John Wiley & Sons, 2008.

Thus, the distance between two samples in the first SC-FDMA symbols $\tilde{x}^{Tx1}_{aM}=\alpha X_a$ and $\tilde{x}^{Tx1}_{bM}=\alpha X_b$ corresponding respectively to the two symbols of the Alamouti pair, that is M(b−a) samples, depends on the distance between the two Alamouti symbols in the first block of symbols which is of (b−a) symbols.

The subcarrier mapping can also be distributed, that is the M elements of each vector $S^{Tx1,2}$ are mapped equally distanced over the entire bandwidth with zero occupying the unused subcarriers.

Thus, when N is a multiple of M, the signal in the time domain at the output of the IDFT module 2.7, $\tilde{x}^{Tx1}=(\tilde{x}^{Tx1}_0,\ldots,\tilde{x}^{Tx1}_{N-1})$, and at the output of the IDFT module 2.8, $\tilde{x}^{Tx2}=(\tilde{x}^{Tx2}_0,\ldots,\tilde{x}^{Tx2}_{N-1})$, have respectively N/M times repetition of the block of symbols X and Y, that is $\tilde{x}^{Tx1}=(\alpha X_0, \alpha X_1,\ldots,\alpha X_{M-1},\ldots,\alpha X_0,\alpha X_1,\ldots,\alpha X_{M-1},\alpha X_0,\alpha X_1,\ldots,\alpha X_{M-1})$ and $\tilde{x}^{Tx2}=(\alpha Y_0,\alpha Y_1,\ldots,\alpha Y_{M-1},\ldots,\alpha Y_0,\alpha Y_1,\ldots,\alpha Y_{M-1},\alpha Y_0,\alpha Y_1,\ldots,\alpha Y_{M-1})$.

Thus, the distance between two samples in the first SC-FDMA symbols $\tilde{x}^{Tx1}_{a+M.i}=\alpha X_a$ and $\tilde{x}^{Tx1}_{b+M.i}=\alpha X_b$ corresponding respectively to the two symbols of the Alamouti pair, that is (b−a) samples depends on the distance between the two Alamouti symbols in the first block of symbols which is of (b−a) symbols.

By distance between two samples it is understood the time difference (or time duration) between the emission in the radio signal of these two samples.

Therefore, the distance between two samples corresponding respectively to symbols of an Alamouti pair is proportional or at least dependent on the distance of these symbols in the first block of symbols.

This is the case for all the other subcarrier mapping types and/or non-integer N/M ratios similar relationships between the symbols and their corresponding samples in the radio signal.

Therefore, by minimizing the maximal precoding distance in the first block of symbols between two symbols of the same pair it minimizes the maximum time duration between samples in the radio signal corresponding to two symbols of the same pair. This enables to minimize the channel changes between the emission of samples in the first and second SC-FDMA symbol corresponding to the symbol $X_a$. By minimizing the channel changes between these emissions of samples it reduces orthogonality loss between symbols of the same Alamouti pair which leads to interferences and performance loss.

The minimizing of the maximum precoding distance between two symbols of the same pair is obtained when the p value is set to a value around Q/2, and specifically when p is equal to ⌈Q/2⌉ and/or ⌊Q/2⌋.

Figure 6:
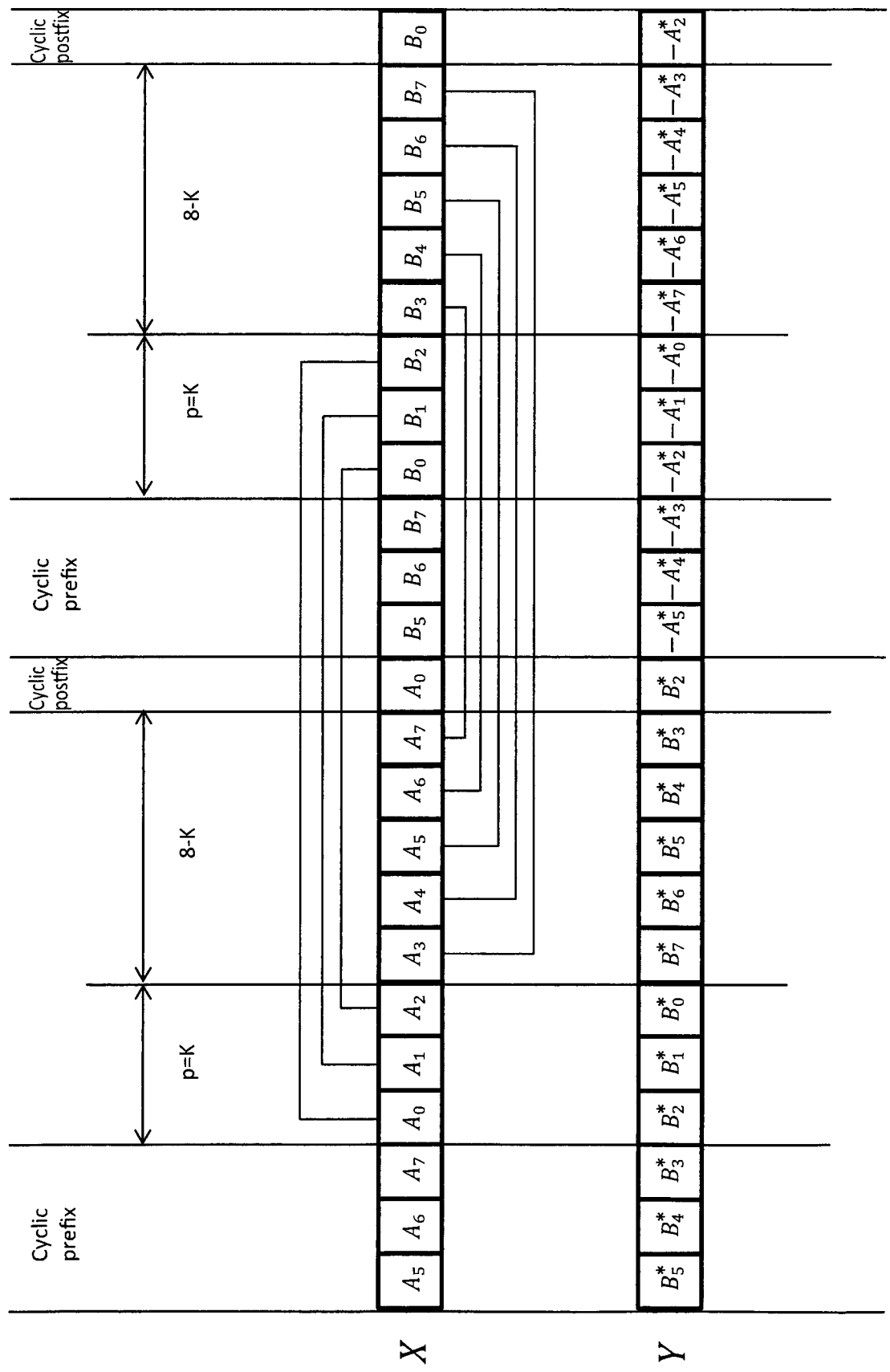
FIG. 6 details the specific SS-STBC like pre-coder logical functioning with the p value set to K according to the invention.

Referring to FIG. 6, details of the specific SS-STBC like pre-coder logical functioning with the p value set to K according to an embodiment. In this example the sizes of P1, P2 and Q are set to simplify the presentation of this embodiment. Thus $(P_1, P_2, Q)=(3,1,8)$. Of course, the present invention is not limited to such sizes of P1, P2 and Q.

The K first symbols of the useful part of the first part of the first block of symbols are paired with the K first symbols of the useful part of the second part of the first block of symbols. Thus, the K symbols issued from the pre-coder from the K first symbols of the useful part of the first part of the first block of symbols are the K first symbols of the useful part of the second part of the second block of symbols.

Thus, the K first symbols of the useful part of the first part of the first block of symbols and their issued (from the pre-coder) symbols are both positioned behind P1 prefix symbols, which enables to protect these 2K symbols from interferences, especially multipath interferences. Note that, in a variant, the prefix can be inserted with respect to the K first symbols of each useful part and not to the Q symbols. That is, the prefix inserted within the first block of symbols contains symbols $A_{K-P1} \ldots A_{K-1}$ and $B_{K-P1} \ldots B_{K-1}$ respectively.

Since the K issued symbols enable to ease the retriever of the K first symbols of the useful part of the first part of the first block of symbols, the K first symbols of the first part forming a group G are more robust to interference. It is therefore, relevant to insert in the group G symbols which specifically need to be protected from interference as reference signal symbols and/or control symbols since they are particularly important for decoding properly the other symbols.

Figure 7:
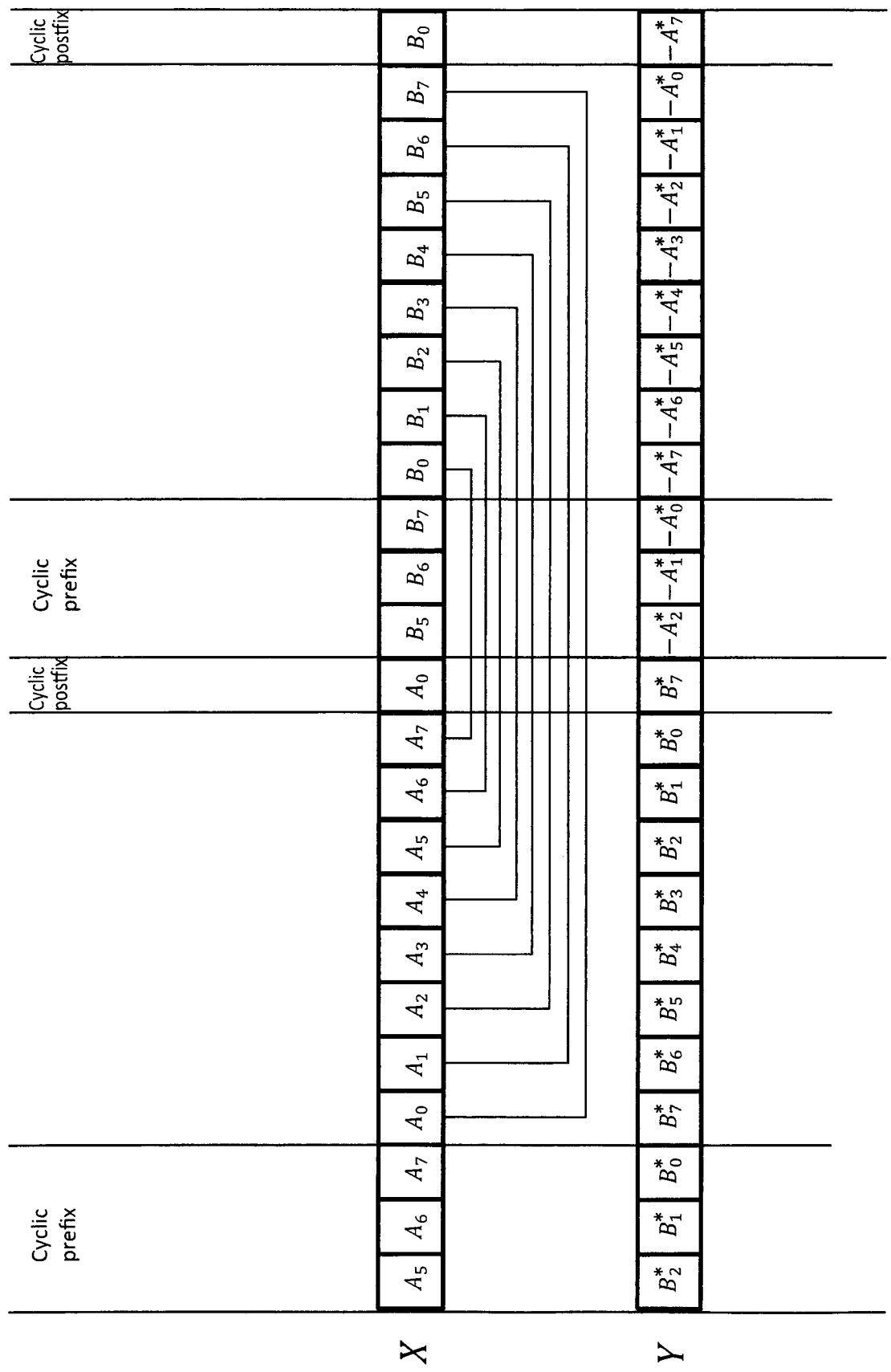
FIG. 7 details the specific SS-STBC like pre-coder logical functioning with the p value set to 0 according to the invention.

Referring to FIG. 7, it gives the details of the specific SS-STBC like pre-coder logical functioning with the p value set to 0 according to an embodiment. In this example the sizes of P1, P2 and Q are set to simplify the presentation of this embodiment. Thus $(P_1, P_2, Q)=(3,1,8)$. Of course, the present invention is not limited to such sizes of P1, P2 and Q.

In this embodiment, the first symbol of the useful part of the first part of the first block of symbols is paired with the last symbol of the useful part of the second part of the first block of symbols. The second symbol of the useful part of the first part of the first block of symbols is paired with the before last symbol of the useful part of the second part of the first block of symbols, and so on. This Alamouti pairing structure is of low complexity for the pre-coder.

Based on such a structure it is possible to define several groups $\{G_i\}_{i \in [0;L]} \cup \{G'_i\}_{i \in [0;L]}$ having $K_i$ symbols each, these several groups being symmetrically arranged. That is, by defining the i-th first group $G_i$ of $K_i$ symbols as the group composed of the symbols from the $(P_1+\Sigma_{j=1}^{i-1} K_j)$-th symbol $$X_{P_1+\sum_{j=1}^{i-1} K_j}$$

to the $(P_1+\Sigma_{j=1}^{i} K_j-1)$-th symbol $$X_{P_1+\sum_{j=1}^{i} K_j-1}$$

of the first block of M symbols; and by defining the i-th first group $G'_i$ of $K_i$ symbols as the group composed of the symbols from the $(M-P_2-\Sigma_{j=1}^{i} K_j)$-th symbol $$X_{M-P_2-\sum_{j=1}^{i} K_j}$$

to the $(M-P_2-\Sigma_{j=1}^{i-1} K_j-1)$-th symbol $$X_{M-P_2-\sum_{j=1}^{i-1} K_j-1}$$

of the first block of M symbols.

Therefore, the symbols of the i-th group $G_i$ are paired with the symbols of the group $G'_i$. The group $G_i$ and the group $G'_i$ are called paired groups. The samples in the first and second SC-FDMA symbols corresponding to symbols of the i-th group are emitted at the same time than the samples in the first and second SC-FDMA symbols corresponding to symbols of the paired group $G'_i$. Therefore, it is possible to separate at the receiver side the processing of samples corresponding to the symbols of a group and its paired group from the processing of other samples corresponding to symbols of other groups.

If the symbols of paired groups are of the same type, for example data symbol, reference signal symbol or control symbol, then at the receiver side it is possible to separate the processing of for example the reference signal part of the radio signal.

In addition, setting the p value, $P_1$ and $P_2$ to zero and having such specific group structure is convenient to insert reference signals according to the PTRS insertion patterns for DFTsOFDM PUSCH described in the 3GPP TS 38.211 Table 6.4.1.2.2.2-1 clause 6.4.1.2.2. Indeed, these insertion patterns are symmetric, that is for example the $N_{group}^{PTRS}$ first symbols and the $N_{group}^{PTRS}$ last symbols of the first block of symbols are set as reference signals. Thus, by setting $K_1$ to $N_{group}^{PTRS}$ the group structure is made compatible with such insertion pattern.

In another example the RSs are inserted in the middle of each half of the first block of symbols, that is in the position (M/4−1; M/4) and (3M/4−1, 3M/4) when inserting two groups of two RS samples each. Thus for example by setting $K_2$ to 2 and $K_1$ to M/4−1 the group structure is made compatible with such insertion pattern. Thus, more generally, setting $K_i=2$ such as $$\sum_{j=1}^{i-1} K_j = \frac{M}{4} - 1 \text{ and } G_i = \left\{\frac{M}{4} - 1, \frac{M}{4}\right\}, G'_i = \left\{\frac{3M}{4} - 1, \frac{3M}{4}\right\}$$

the group structure is made compatible with such insertion pattern.

In another example the symbols of the paired groups in which should be inserted the RSs are set to zero in the first block of symbols before applying the pre-coder. The RS are then inserted after applying the pre-coder in replacement to the zeros. For example this insertion can be made before applying the DFT modules 2.3 and 2.4 that is by setting the symbols set to zero in the first and second block of symbols to the desired values. In the case of reference signals, since their values are known by the receiver, there is no need to have the values of the reference signals inserted in the second block of symbols equal to the values of these symbols that would have been obtained if the reference signals inserted in the first block of symbols would have been pre-coded. As an equivalent implementation option, reference signals can be inserted after DFT (that is in the frequency domain) or after IDFT by adding a corresponding signal to obtain the same or equivalent signal as if the reference signal where inserted before applying the DFT.

Figure 8:
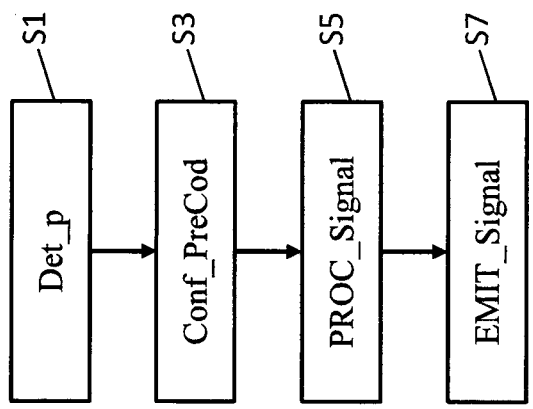
FIG. 8 illustrates a flowchart representing the steps for transmitting symbols in the radio signal according to the invention.

Referring to FIG. 8, illustrates a flowchart representing the steps for transmitting symbols in the radio signal according to the invention.

At step S1 the parameters used to configure the pre-coder module 2.2 are determined. That is, the p value, the size of $P_1$, $P_2$ and M are determined. These parameters are called the pre-coder's parameters.

This determination of the parameters is done according to the scheme of the communication and/or the configuration of the cell determined by the base station 1.2.

In the case where the transmitter is a mobile terminal, the base station 1.2 can previously determine the parameters of the communication and set the pre-coder's parameters of the transmitter 1.1.

Information representative of the pre-coder's parameters can be sent to the transmitter 1.1. Therefore, the transmitter 1.1 receives information representing or allowing to compute the p value and the size of $P_1$, $P_2$ and M based on which the transmitter 1.1 can determine effectively the p value and the size of $P_1$, $P_2$ and M.

For example, the base station 1.2 can transmit to the transmitter 1.1:
 a cell specific p value information; and/or
 a transmitter specific p value information; and/or
 the size of $P_1$, $P_2$ and M.

These parameters and especially the p value can be determined for example by the base station 1.2 based on:
 a cell-specific configuration and/or
 dynamic control indication for example a DCI indicator/format and/or;
 a reference signal, RS, configuration/insertion pattern and/or;
 user-specific parameters such as (but not limited to) modulation and coding scheme, resource allocation size and/or;
 a p' value used by another transmitter in the same cell and/or;
 sets of predetermined values ($p_i$, $P_{1i}$, $P_{2i}$, $M_i$).

The p value may also be determined randomly by the base station 1.2 among a set of predetermined values.

In an alternative the base station 1.2 does not send to the mobile terminal 1.1 the information representing the p value and the size of $P_1$, $P_2$ and M, but sends one of the above mention information based on which the terminal 1.1 can deduce the pre-coder parameters set by the base station 1.2. For example, the use of a specific reference signal configuration can be related to specific pre-coder's parameters.

In an alternative embodiment the base station 1.2 can determine the scheme of the communication (for examples the RS insertion pattern, the Modulation and Coding Scheme, MCS, . . . ) and/or the configuration of the cell but not the pre-coder's parameters, leaving the transmitter 1.1 determine and/or compute the parameters according to the communication scheme. In this case, the transmitter 1.1 may once the pre-coder's parameters determined send to the base station 1.2 information enabling the base station 1.2 to retrieve the pre-coder's parameters.

In the case where the transmitter 1.1 is the base station and the receiver 1.2 is the mobile terminal, the base station 1.1 determines the parameters used to configure the pre-coder module 2.2 of the base station 1.1. That is, the p value, the size of $P_1$, $P_2$ and M are set. These parameters are called the pre-coder's parameters.

These parameters and especially the p value to be used when communicating with the receiver 1.2 can be determined by the base station 1.1 base on:
 a cell-specific configuration;
 a reference signal, RS, configuration/insertion pattern;
 user-specific parameters determined for the receiver 1.2;
 a p' value used by an adjacent base station;
 sets of predetermined values ($p_i$, $P_{1i}$, $P_{2i}$, $M_i$).

Additionally, like in the previous embodiments the base station 1.1 provides the mobile terminal 1.2 information allowing the mobile terminal 1.2 to deduce the parameters used by the pre-coder, thus enabling the mobile terminal 1.2 to decode the received communication.

Additionally, in both cases, the mobile terminal being either the receiver 1.2 or the transmitter 1.1, the mobile terminal can deduce these parameters based on a rule commonly known by both the base station and the mobile terminal.

In yet another example, both the transmitter and the receiver are mobile terminals. The p value can be determined based on predetermined rules or by cooperation.

(e.g. each mobile terminal determines the p value to be used for its own communication and transfers it to the other;
 e.g. each mobile terminal determines the p value to be used for its own communication and the other terminal can implicitly determine the used value from other information;
 e.g. one terminal decides the p value to be used during communication in both directions and transfers it to the other;
 e.g. one terminal decides the p value to be used during communication in both directions and the other terminal can implicitly determine the used value from other information;
 e.g. terminals exchange information allowing to determine a common p value;
 e.g. both terminals apply a set of known rules, allowing them to unambiguously determine the p value based on other known parameters/configurations; e.g. the p value is fixed for all sidelink communication, etc)

At step S3 the pre-coder module 2.2 is configured according to the pre-coder's parameters determined by the terminal 1.1.

At step S5 the signal is processed, that is on the first block of symbols $X(X_0, \ldots X_{M-1})$ is applied the specific SS-STBC like pre-coder module 2.2 previously configured to obtain the second block of symbols $Y=(Y_0, \ldots Y_{M-1})$. Then on each of the first and second blocks of symbols is applied an SC-FDMA scheme (DFT modules 2.3 and 2.4, subcarrier mapping modules 2.5 and 2.6, IDFT modules 2.7 and 2.8).

At step S7 the signal is emitted by Tx1 2.0 and Tx2 2.1.

The invention claimed is:

1. A method for transmitting symbols through a radio signal in a wireless communication system, said radio signal being emitted by a transmitter comprising at least two transmit antennas, each antenna being configured for transmitting on at least an even number M, strictly greater than 1, of different frequencies, said method comprising:
 applying to a first block of M symbols $X=(X_0, \ldots X_{M-1})$ a pre-coder to obtain a second block of M symbols $Y=(Y_0, \ldots Y_{M-1})$, with $$Y_k = \begin{cases} \varepsilon X^*_{\frac{M}{2}+P_1+mod(-k+P_1+p-1,Q)}, & \text{for } k \in \left[\!\left[ P_1; \frac{M}{2}-P_2 \right]\!\right] \\ -\varepsilon X^*_{P_1+mod(-k+P_1+\frac{M}{2}+p-1,Q)}, & \text{for } k \in \left[\!\left[ \frac{M}{2}+P_1; M-P_2 \right]\!\right] \end{cases},$$

with $P_1$ and P2 predefined integers, positive or equal to 0, such as $P_1+P_2$ is strictly smaller than M/2, p a predetermined integer Q is an integer, and ε is 1 or −1 and $X_k^*$ being the complex conjugate of $X_k$;

applying at least an M size DFT then an N size IDFT corresponding to a first transmit antenna, to the first block of M symbols to obtain a first single-carrier frequency division multiple access, SC-FDMA, symbol representing the first block of M symbols, said first SC-FDMA symbol being of a given duration;

applying at least a M size DFT then a N size IDFT corresponding to a second transmit antenna, to the second block of M symbols to obtain a second single-carrier frequency division multiple access, SC-FDMA, symbol representing the second block of M symbols, said second SC-FDMA symbol being of the given duration;

transmitting during a time interval of the given duration, respectively on the first and second transmit antennas, simultaneously the first and second SC-FDMA symbols, into the radio signal.

2. The method according to claim 1, wherein mod (p, Q)≠1, with Q=M/2−(P1+P2).

3. The method according to claim 1, wherein $$\mathrm{mod}(p, Q) \in \left[\!\!\left[ \frac{Q}{4}; \frac{3 \cdot Q}{4} \right]\!\!\right]$$

with Q=M/2−(P1+P2).

4. The method according to claim 3, wherein mod(p, Q) is equal to ⌈Q/2⌉ and/or ⌊Q/2⌋.

5. The method according to claim 1, wherein mod(p, Q)=K, where K is a number of symbols in a group of symbols comprising symbols from the $P_1$-th symbol $X_{P_1}$ of the first block of M symbols to the $(P_1+K)$-th symbol $X_{P_1+K}$ of the first block of M symbols.

6. The method according to claim 5, wherein the symbols of the group of symbols are reference signal symbols and/or control symbols.

7. The method according to claim 1, wherein mod(p, Q)=0, with Q=M/2−(P1+P2).

8. The method according to claim 7, wherein L first groups $G_i$ of respectively $K_i$ symbols of the first block of M symbols, with $\Sigma_{j=1}^{L} K_j$ equal to Q are defined and for each i:

the $K_i$ symbols of the i-th first group $G_i$ being the symbols from the $(P_1+\Sigma_{j=1}^{i-1}K_j)$-th symbol $$X_{P_1+\sum_{j=1}^{i-1} K_j}$$

to the $(P_1+\Sigma_{j=1}^{i}K_j-1)$-th symbol $$X_{P_1+\sum_{j=1}^{i} K_j - 1}$$

of the first block of M symbols are of the same i-th type as $K_i$ symbols of a second group $G'_i$ of $K_i$ symbols of the first block of M symbols, the $K_i$ symbols of the second group $G'_i$ being the symbols from the $(M-P_2-\Sigma_{j=1}^{i}K_j)$-th symbol $$X_{M-P_2-\sum_{j=1}^{i} K_j}$$

to the $(M-P_2-\Sigma_{j=1}^{i-1}K_j-1)$-th symbol $$X_{M-P_2-\sum_{j=1}^{i-1} K_j - 1}$$

of the first mock of M symbols.

9. The method according to claim 8, wherein for each i, the i-th type of symbol is one among data symbol, reference signal symbol or control symbol.

10. The method according to claim 9, wherein for each i, the symbols of the i-th group $G_i$ are of different type of symbol than the symbols of the i+1-th group $G_{i+1}$.

11. The method according to claim 1, wherein determining the p value is based at least on one among:
a cell specific p value information;
a set of predetermined values;
a dynamic control indication;
a reference signal, RS, configuration;
a Modulation and Coding Scheme, MCS;
a user-specific parameter;
a size of a resource allocation allocated to the transmitter;
a transmitter specific p value information;
another transmitter's p' value such as the another transmitter applies to a first block of M' symbols $X=(X_0, \ldots X_{M'-1})$ a pre-coder to obtain a second block of M' symbols $Y=(Y_0, \ldots Y_{M'-1})$, with $$Y_k = \begin{cases} \varepsilon X^*_{\frac{M'}{2}+P'_1+\mathrm{mod}(-k+P'_1+p'-1,Q)}, & \text{for } k \in \left[\!\!\left[ P'_1; \frac{M'}{2} - P'_2 \right]\!\!\right] \\ -\varepsilon X^*_{P'_1+\mathrm{mod}(-k+P'_1+\frac{M}{2}+p'-1,Q)}, & \text{for } k \in \left[\!\!\left[ \frac{M'}{2} + P'_1; M - P'_2 \right]\!\!\right] \end{cases},$$

with $P'_1$ and $P'_2$ predefined integers, positive or equal to 0, such as $P'_1+P'_2$ is strictly smaller than M'/2 and ε is 1 or −1.

12. The method according to claim 1, wherein the p value is determined randomly among a set of predetermined values.

13. The method according to claim 1, wherein a value of a n-th symbol $X_n$ of the first block of M symbols:
is equal to a value of a (n+Q)-th symbol $X_{n+Q}$ of the first block of M symbols if n∈ ⟦0;$P_1$−1⟦ ∪ ⟦M/2;M/2+$P_1$−1⟦;
is equal to a value of a (n−Q)-th symbol $X_{n-Q}$ of the first block of M symbols if n∈

$$\left[\!\!\left[ \frac{M}{2} - P_2; \frac{M}{2} - 1 \right]\!\!\right] \cup [\!\![ M - P_2; M - 1 ]\!\!].$$

14. A non-transitory computer readable medium storing a program comprising code instructions to perform the method according to claim 1, when said instructions are run by at least a processor.

15. Transmitter for transmitting symbols through a radio signal in wireless communication system, said transmitter comprising:
at least two transmit antennas, each antenna being configured for transmitting on at least an even number M, strictly greater than 1, of different frequencies, a processor; and a non-transitory computer-readable medium comprising instructions stored thereon, which when executed by the processor configure the transmitter to:

apply to a first block of M symbols $X=(X_0, \ldots X_{M-1})$ a precoder to obtain a second block of M symbols $Y=(Y_0, \ldots Y_{M-1})$, with $$Y_k = \begin{cases} \varepsilon X^*_{\frac{M}{2}+P_1+mod(-k+P_1+p-1,Q)}, & \text{for } k \in \left[P_1; \frac{M}{2} - P_2\right] \\ -\varepsilon X^*_{P_1+mod(-k+P_1+\frac{M}{2}+p-1,Q)}, & \text{for } k \in \left[\frac{M}{2} + P_1; M - P_2\right] \end{cases},$$

with $P_1$ and $P_2$ predefined integers, positive or equal to 0, such as $P_1+P_2$ is strictly smaller than M/2, p a predetermined integer Q is an integer, and ε is 1 or −1 and $X_k^*$ being the complex conjugate of $X_k$;

apply at least an M size DFT then an N size IDFT corresponding to a first transmit antenna, to the first block of M symbols to obtain a first single-carrier frequency division multiple access, SC-FDMA, symbol representing the first block of M symbols, said first SC-FDMA symbol being of a given duration;

apply at least a M size DFT then a N size IDFT corresponding to a second transmit antenna, to the second block of M symbols to obtain a second single-carrier frequency division multiple access, SC-FDMA, symbol representing the second block of M symbols, said second SC-FDMA symbol being of the given duration;

transmit during a time interval of the given duration, respectively on the first and second transmit antennas, simultaneously the first and second SC-FDMA symbols, into the radio signal.

* * * * *